United States Patent
Bansal et al.

(10) Patent No.: US 10,589,749 B2
(45) Date of Patent: Mar. 17, 2020

(54) METHOD AND SYSTEM FOR EARLY DETECTION OF VEHICLE PARTS FAILURE

(71) Applicant: Tata Consultancy Services Limited, Mumbai (IN)

(72) Inventors: Vandita Bansal, Bangalore (IN); Surendra Babu Gadwala, Bangalore (IN); Malini Jayaraman, Bangalore (IN); Omar Sharif, Thane (IN); Senthil Kumar Kaliraj, Coimbatore (IN)

(73) Assignee: Tata Consultancy Services Limited, Mumbai (IN)

( * ) Notice: Subject to any disclaimer, the term of this patent is extended or adjusted under 35 U.S.C. 154(b) by 65 days.

(21) Appl. No.: 15/902,474

(22) Filed: Feb. 22, 2018

(65) Prior Publication Data

US 2018/0237029 A1 Aug. 23, 2018

(30) Foreign Application Priority Data

Feb. 23, 2017 (IN) .............................. 201721006576

(51) Int. Cl.
*B60W 50/02* (2012.01)
*G07C 5/08* (2006.01)
*G06Q 10/06* (2012.01)

(52) U.S. Cl.
CPC ... *B60W 50/0205* (2013.01); *G06Q 10/06375* (2013.01); *G07C 5/0808* (2013.01); *B60W 2050/021* (2013.01)

(58) Field of Classification Search
None
See application file for complete search history.

(56) References Cited

U.S. PATENT DOCUMENTS

2007/0271014 A1* 11/2007 Breed ..................... B60J 10/00
    701/31.9
2011/0119231 A1   5/2011 Namburu et al.
(Continued)

FOREIGN PATENT DOCUMENTS

| CN | 103631788 | 3/2014 |
| JP | 2003/331087 | 11/2003 |
| WO | WO-2011/033651 | 3/2011 |

*Primary Examiner* — Abdhesh K Jha
(74) *Attorney, Agent, or Firm* — Finnegan, Henderson, Farabow, Garrett & Dunner LLP (57) ABSTRACT

System and method for early detection of vehicle parts failure are disclosed. The method includes identifying discriminative rules from unstructured and structured data corresponding to subsystems of a vehicle. Causal parts categories are mapped to the subsystems based on the discriminative rules to obtain a plurality of causal part-subsystem pairs. The causal part categories are representative of vehicle parts responsible for failure of corresponding subsystems. Scores are assigned to the causal part-subsystem pairs based on an occurrence of causal part categories to a corresponding subsystem within a source. An emerging issue score is computed based on the scores, a corresponding weightage associated with the sources of the causal part category, and an extent of coverage of the each causal part in each of the plurality of causal part-subsystem pairs. The emerging issue score is compared with the threshold vehicle part failure score to identify causal part categories associated with vehicle parts failure.

11 Claims, 3 Drawing Sheets

(56) References Cited

U.S. PATENT DOCUMENTS

| | | | |
|---|---|---|---|
| 2014/0278406 A1* | 9/2014 | Tsumura | G06Q 10/06 704/235 |
| 2016/0035150 A1* | 2/2016 | Barfield, Jr. | G07C 5/008 701/29.3 |
| 2016/0232466 A1* | 8/2016 | Kumar Jain | G06Q 10/0635 |

* cited by examiner

METHOD AND SYSTEM FOR EARLY DETECTION OF VEHICLE PARTS FAILURE

PRIORITY CLAIM

This U.S. patent application claims priority under 35 U.S.C. § 119 to: India Application No. 201721006576, filed on Feb. 23, 2017. The entire contents of the aforementioned application are incorporated herein by reference.

TECHNICAL FIELD

The present invention relates to a method and system for early detection of vehicle parts failure, and in particular to method and system for early detection of vehicle parts failure using structured and unstructured data associated with the vehicle.

BACKGROUND

It is essential to detect failure of parts of vehicles, particularly, machines during early stages so as to avoid damage of other parts of the vehicles. In certain scenarios, faults are detected late, and in certain other scenarios faults are not detected at all. In such scenarios, the faults may lead to a cascading effect leading to complete failure of the machinery, which can be hazardous.

One example of such machinery includes a vehicle. With the growth of automotive industry, it has been observed that the vehicles are being equipped with numerous sensitive and complex components, since the automobile manufacturers are seeking to improve the quality of automotive products. Auto Original Equipment Manufacturers' (OEM) are struggling to identify emerging failures of vehicle parts that could cascade and potentially lead to recalls. Vehicle field failure early warning relates to the ability to predict emerging failures so that the auto OEM can take precautionary measures and avoid a potential recall.

Conventionally, historical failure data of the vehicles is used to model failure rate of vehicle parts. The inventors here have recognized several technical problems with such conventional systems, as explained below. The detection of vehicle parts failures using the conventional methods has its limitations, since the historical failure data such as warranty claims, is a lagging indicator of failure and does not also capture problems faced by the customer. This eventually leads to a longer emerging failure detection cycle.

SUMMARY

This summary is provided to introduce aspects related to system and method for early detection of vehicle parts failure and the aspects are further described below in the detailed description. This summary is not intended to identify essential features of the claimed subject matter nor is it intended for use in determining or limiting the scope of the claimed subject matter.

In one implementation, a computer-implemented method for early detection of vehicle parts failure is provided. The method includes identifying, via one or more hardware processors, a plurality of discriminative rules from an unstructured data and a structured data corresponding to the plurality of subsystems. The unstructured data and a structured data derived from a plurality of sources. Further, the method includes mapping, via the one or more hardware processors, based on the plurality of discriminative rules, a plurality of causal part categories associated with the structured data and the unstructured data with the plurality of subsystems to obtain a plurality of causal part-subsystem pairs, a causal part-subsystem pair comprising mapping of a causal part category with a corresponding subsystem, and wherein the plurality of causal part categories are representative of vehicle parts responsible for failure of a corresponding subsystem of the plurality of subsystems. Furthermore, the method includes assigning, via the one or more hardware processors, a score to each of the plurality of causal part-subsystem pairs based on the pattern of occurrence of causal part categories corresponding to a subsystem of the plurality of subsystems within a source of the plurality of sources. Furthermore, the method includes computing, via the one or more hardware processors, corresponding to each causal part category of the plurality of causal part categories, an emerging issue score based on the score assigned to each of the plurality of causal part-subsystem pairs and a corresponding weightage associated with a source of the plurality of sources of the causal part category, and an extent of coverage of the each causal part in the each of the plurality of causal part-subsystem pairs. Also, the method includes identifying, via the one or more hardware processors, one or more causal part categories associated with vehicle parts failure based on a comparison of the emerging issue score with a threshold vehicle part failure score.

In another implementation, a computer-implemented system for early detection of vehicle parts failure is provided. The system includes one or more memories storing instructions and one or more hardware processors coupled to said one or more memories. The one or more hardware processors are configured by said instructions to identify a plurality of discriminative rules from an unstructured data and a structured data corresponding to the plurality of subsystems. The unstructured data and a structured data derived from a plurality of sources. Further, the one or more hardware processors are configured by said instructions, via the one or more hardware processors, to map based on the plurality of discriminative rules, a plurality of causal part categories associated with the structured data and the unstructured data with the plurality of subsystems to obtain a plurality of causal part-subsystem pairs, a causal part-subsystem pair comprising mapping of a causal part category with a corresponding subsystem, and wherein the plurality of causal part categories are representative of vehicle parts responsible for failure of a corresponding subsystem of the plurality of subsystems. Furthermore, the one or more hardware processors are configured by said instructions to assign a score to each of the plurality of causal part-subsystem pairs based on the pattern of occurrence of causal part categories corresponding to a subsystem of the plurality of subsystems within a source of the plurality of sources. Furthermore, the one or more hardware processors are configured by said instructions to compute corresponding to each causal part category of the plurality of causal part categories, an emerging issue score based on the score assigned to each of the plurality of causal part-subsystem pairs and a corresponding weightage associated with a source of the plurality of sources of the causal part category, and an extent of coverage of the each causal part in the each of the plurality of causal part-subsystem pairs. Also, the one or more hardware processors are configured by said instructions to identify one or more causal part categories associated with vehicle parts failure based on a comparison of emerging issue score with a threshold vehicle part failure score.

In yet another implementation, a non-transitory computer-readable medium having embodied thereon a computer program for executing a method for early detection of vehicle parts failure is provided. The method includes identifying a plurality of discriminative rules from an unstructured data and a structured data corresponding to the plurality of subsystems. The unstructured data and a structured data derived from a plurality of sources. Further, the method includes mapping, based on the plurality of discriminative rules, a plurality of causal part categories associated with the structured data and the unstructured data with the plurality of subsystems to obtain a plurality of causal part-subsystem pairs, a causal part-subsystem pair comprising mapping of a causal part category with a corresponding subsystem, and wherein the plurality of causal part categories are representative of vehicle parts responsible for failure of a corresponding subsystem of the plurality of subsystems. Furthermore, the method includes assigning a score to each of the plurality of causal part-subsystem pairs based on the pattern of occurrence of causal part categories corresponding to a subsystem of the plurality of subsystems within a source of the plurality of sources. Furthermore, the method includes computing corresponding to each causal part category of the plurality of causal part categories, an emerging issue score based on the score assigned to each of the plurality of causal part-subsystem pairs and a corresponding weightage associated with a source of the plurality of sources of the causal part category, and an extent of coverage of the each causal part in the each of the plurality of causal part-subsystem pairs. Also, the method includes identifying, one or more causal part categories associated with vehicle parts failure based on a comparison of the emerging issue score with a threshold vehicle part failure.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like/similar features and modules.

DETAILED DESCRIPTION

The present disclosure relates to a method and system for early detection of vehicle parts failure. The early detection of vehicle failures is conventionally done based on historical failure data in form of warranty claims. However, the early detection of vehicle failures has limitations as claims is a lagging indicator of failure and does not capture all problems faced by the customer, thereby eventually leading to a longer emerging failure detection cycle.

There are leading indicators of failures that can be leveraged for early detection of vehicle failures. Examples of such indicators include voice of customer data such as customer complaints, surveys, technician notes, and so on and failure codes of sensor data such as diagnostic trouble codes. Said indicators may come from various unstructured sources, and accordingly, the data derived from said indicators may be referred to as unstructured data. Various embodiments of the present disclosure facilitates in identifying the impact of said indicators on the vehicle failures, quantify the impact and integrate into a common model to be able to determine a combined effect on the vehicle failure, thereby aiding in the reduction of the detection cycle. It will be noted herein that for the brevity of description, the aforementioned embodiments are explained with reference to vehicle part failure. However, it will be noted that the disclosed embodiments may be equally applicable to other objects such as machinery.

The disclosed embodiments provide method and system for early detection of vehicle parts failure. For example, in an embodiment, a system for early detection of vehicle parts failure is provided to receive the structured data which includes sensor data such as diagnostic trouble codes and unstructured data which includes customer complaints, surveys, technician notes, and so on. Said system is capable of categorizing the unstructured data associated with the subsystems of the vehicle into a plurality of causal part-subsystem pairs, where each of the causal part-subsystem pair represents a correspondence between a causal parts that is responsible for the failure of a subsystem with that subsystem. Also, the system automatically maps causal parts categories associated with the structured data and the unstructured data using the domain corpus of vehicle subsystem built from a training data set. Herein, the term 'causal parts' may refer to lowest level of a part level within the vehicle. For example, causal parts pertaining to the subsystem 'audio navigation' may include reprogramming, control assembly, DVD ROM, speaker unit, audio visual system re-program, controller assembly display, audio visual reprogram, CD deck, speaker unit, microphone unit, battery remote control, and so on. Further, the system assigns score to the causal part categories based on the vehicle subsystem.

The system generates an emerging issue score based on a weightage associated with the data source from where the data pertaining to the causal part is derived and an extent of coverage of the causal part in the data source in a vehicle subsystem. The system may further identify one or more causal part categories associated with vehicle parts failure based on a comparison of the emerging issue score with a threshold vehicle part failure score.

While aspects of described system and method for early detection of vehicle parts failure, it may be implemented in any number of different computing systems, environments, and/or configurations, the embodiment's are described in the context of the following exemplary system.

Figure 1:
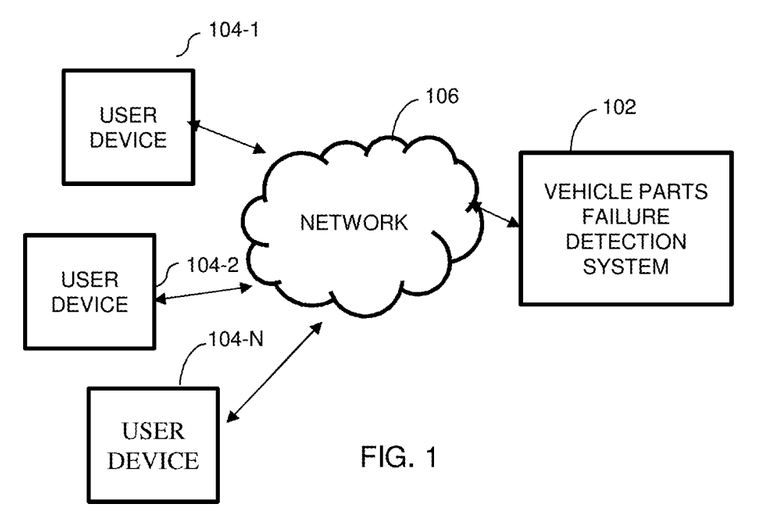
FIG. 1 illustrates a network implementation of a system for early detection of vehicle parts failure using structured and unstructured data according to some embodiments of the present disclosure.

FIG. 1 illustrates an exemplary schematic diagram of early detection of vehicle parts failure system 100 in accordance with one or more embodiments of a system of the present disclosure. Although the present disclosure is explained by considering that the system 100 is implemented as a software program on a server, it may be understood that the system 100 may also be implemented in a variety of computing systems, such as a laptop computer, a desktop computer, a notebook, a workstation, a mainframe computer, a server, a network server, cloud, and the like. It will be understood that the system 100 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a hand-held device, and a workstation.

FIG. 1 illustrates a block diagram of a vehicle parts failure detection system 102 communicating with one or more user devices 104-1, 104-2 . . . 104-N through a network 106 according to an embodiment of the present disclosure. The vehicle parts failure detection system 102 (hereinafter referred to as 'system 102') receives vehicle parts failure data from a plurality of sources. The plurality of sources of vehicle part data may include structured data sources and unstructured data sources. The structured data sources may include data collected from the sensors mounted on/in the vehicle. The unstructured data sources may include sources from where the information cannot be directly derived. Instead, the unstructured data is to be analysed to retrieve meaningful information. Examples of unstructured data sources may include, but are not limited to, customer complaints, technician feedback and surveys, customer appointment, call centre logs, repair order data, data collected during customer interaction with a vehicle dealer or call centre technician, dealer interaction with the call centre technician, and so on. The structured data and unstructured data are source of vehicle parts failure information. The structured data can provide tangible information regarding vehicle parts failures, since said information is tracked and recorded with the sensors. The unstructured data include lot of intangible information that can direct one towards one or more potential vehicle parts failures. For example, technician feedback and surveys can provide instances of failure/potential failures of one or more vehicle parts over a period of time due to reasons such as wear and tear, unexpected customer complaints, and so on. In order to accurately predict/detect vehicle parts failures, it is essential to derive meaningful insights from both the structured data as well as the unstructured data.

In an embodiment, in order to derive meaningful insights from the vehicle parts data, the system 102 is caused to map a plurality of causal parts categories associated with the structured data and the unstructured data using the domain corpus of vehicle subsystem built from the training data set. Herein, the term "Causal Part Categories" refers to the smallest level of detail which leads to a failure in the vehicle. For example, failure of audio-video display can lead to failure of audio navigation system in a vehicle. As such, the 'audio-video display' is a causal part category for the subsystem, namely 'audio navigation system'. Based on the mapping of causal part categories with the vehicle subsystem, scores are assigned. Further, emerging issue score corresponding to various causal parts are computed in such a manner that contribution of a source of data (structured and/or unstructured data) is accounted for while computing the emerging issue score. In an example embodiment, different weightages may be assigned to and the scores based on the source of data and the extent of coverage of the causal part in the source in a vehicle subsystem. The scores of the structured and the unstructured data are then combined to form an emerging issue score. One or more causal part categories associated with vehicle parts failure is identified based on a comparison of aggregated score with a threshold vehicle part failure score.

The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. Various components and functionalities of the system 102 are described further with reference to FIG. 2.

Figure 2:
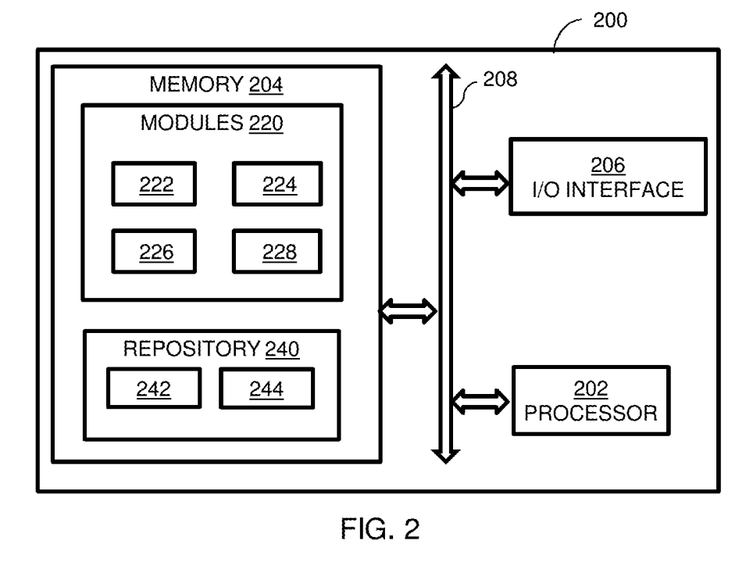
FIG. 2 illustrates a system for early detection of vehicle parts failure using structured and unstructured data, according to some embodiments of the present disclosure.

FIG. 2 illustrates a block diagram of a system 200 for detection of vehicle parts failure in accordance with an example embodiment. In an example embodiment, the system 200 may be embodied in, or is in direct communication with the system, for example the system 102 (FIG. 1). In an embodiment, the system predicts vehicle parts failure based on an analysis of structured and unstructured data derived from a plurality of sources. The system 200 includes or is otherwise in communication with at least one processor such as a processor 202, at least one memory such as a memory 204, and an I/O interface 206. The processor 202, memory 204, and the network interface element 206 may be coupled by a system bus such as a system bus 208 or a similar mechanism.

The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 204.

The I/O interface 206 may include a variety of software and hardware interfaces, for example, a web interface, a graphical user interface, and the like. The I/O interface 206 may allow the system 200 to interact with a user directly or through the user devices 104. Further, the I/O interface 206 may enable the system 200 to communicate with other computing devices, such as web servers and external data servers (not shown). The I/O interface 206 may facilitate multiple communications within a wide variety of networks and protocol types, including wired networks, for example, LAN, cable, etc., and wireless networks, such as WLAN, cellular, or satellite. The I/O interface 206 may include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types. In one implementation, the modules 220 may include a lexicon building module 222, a text classification module 224, a sensor data module 226, a prioritization module 228 and other modules 230. The other modules 230 may include programs or coded instructions that supplement applications and functions of the system 200.

The repository 240, amongst other things, includes a system database 242 and other data 244. The other data 244 may include data generated as a result of the execution of one or more modules in the other modules 228. In an embodiment, the lexicon building module 222 is configured to create industry specific lexicon by using a training data set. In an embodiment, the lexicon building module 222 may obtain a training data set tagged to various data sources such as customer appointment data, repair order data, survey data, social media data and so on. Each of these data sets may include differential information with respect to the part failure of the vehicle. Herein differential information refers to the fact that the quality of information across different data sets may be different. For example, data collected from social media may be written by a customer in a natural language. Other datasets such as those derived from Technician call center may be sufficiently technical and may give more accurate information regarding various vehicle parts that may have failed. On the other hand, the Customer Appointment Data and the Repair Order Data may include usage of various Service associated terms and content such as, "Oil and Filter Change", "Tire Pressure check", and so on since these are regular services performed on a vehicle and not actually refer to a specific failure. So, such data records which have not really contributed to the failure of vehicle parts may have to be removed from the data in order to identify the problems being faced by the customer.

Various examples of the data sets including the differential information are mentioned below.

For instance, example of Customer Appointment Log may include following differential information as given in Table 1:

TABLE 1

| Appointment Date | VIN | Dealer Name | Customer Complaint |
|---|---|---|---|
| 3 Mar. 2015 | Cjklkla | ABX | CUSTOMER STATES THE TRANSMISSION JERKS AT LOW SPEEDS. RADIO GOES BLANK AND WILL NOT PLAY |
| 5 Mar. 2015 | jlksllaws | CJL | CUSTOMER STATES THAT THE BATTERY IS LEAKING. |

In another instance, example of Call Center Data Log may include following differential information as given Table 2:

TABLE 2

| Call Date | VIN | Technician Name | Customer Complaint |
|---|---|---|---|
| 3 Mar. 2015 | Jkhhsa | THEAI | Call Log Created by Theai-Customer states the STEERING WHEEL IS STIFF |
| 5 Mar. 2015 | Yrtrasa | FGADD | Call Log Created by FGADD-Customer is facing problems with the acceleration |

Here the terms such as "Transmission Jerks", "Radio goes blank", "Steering Wheel is stiff", "Problems with the acceleration" are examples of issues faced by the customer that may be attributed to the respective causal parts.

In order to identify a plurality of discriminative rules from the unstructured data corresponding to the plurality of subsystems of the vehicle, the lexicon building module 222 may remove common English words like "from", "the", "a", "their" and so on from the data. Further, the lexicon building module 222 obtains a list of n-grams associated with each category (Subsystem). In an embodiment, the n-grams associated with each category may be obtained by applying a cut-off rule, meaning thereby that any word or phrase associated with the subsystem should occur more than a predefined threshold percentage of the times in that category in terms of frequency. For instance, the frequency of occurrence of any word or phrase associated with the subsystem may be 20 percent of the times in said category.

The lexicon building module 222 may also remove all the words which are common in more than n-number of subsystems. For, example if by definition there are 10 subsystems in a car, then if a word like "leak" is associated with more than 8 sub-systems with high frequency then it may be an indicator that said word may not be able to indicate which "Sub-system" it is referring to. Accordingly, such words which may not provide information regarding associated subsystems are also removed from the list of words.

The lexicon module 222 performs a variance analysis for words appearing in more than one class. For example if it is determined that the words are occurring with more than one Sub-system and the variance across categories is low, then such words may be removed from the lexicon. In an example, the word "around" may appearing in more than one category but the variance of the frequency of this word is low, therefore is the word "around" may be removed from the list. Another word "airbag: may be retained in the lexicon upon a determination that the variance of the word "airbag" is high.

The lexicon building module 222 may further facilitate in building a final lexicon for each subsystem with domain expertise knowledge. Example list of lexicon words for a sub-systems brakes and electronic wiring may include, as presented below in Table 3:

TABLE 3

| SUB SYSTEM | WORDS |
|---|---|
| Brakes | ab control unit |
| Brakes | Booster |
| Brakes | Brake |
| Brakes | brake light |
| Brakes | brake pad |
| Brakes | brake squeak |
| Brakes | brake squeal |
| Brakes | brake squeek |
| Brakes | brake squeel |
| Brakes | front brake |
| Brakes | front brake pad |
| Brakes | front brake rotor |
| Brakes | front pad |
| Brakes | front rear |
| Brakes | front rotor |
| Electronics | Acceleration |
| Electronics | Acid |
| Electronics | Alternator |
| Electronics | Battery |
| Electronics | Battery fail |
| Electronics | battery fail load |
| Electronics | battery fail test |
| Electronics | battery leak |
| Electronics | battery low |
| Electronics | battery replace |
| Electronics | battery test |

In an embodiment, a text classification module 224 is configured to classify each of the comments of the datasets comprising of unstructured data to the respective causal part data associated with the subsystems using machine learning techniques. The unstructured data may include data derived from unstructured sources such as complaint logs, appointment logs, surveys, opinion expressed by customers on the web, warranty data and so on. The text classification module 224 may perform basic text cleansing operations on the textual information of the mapped data set like stop word removal, special characters removal, converting all characters into lower case and so on.

Further, the text classification module 224 splits the data into development data (70%) and validation data (30%). The machine learning models like SVM, Naïve Bayes, Random Forest, Xg Boost, and so on may be trained on for example, 70% of the development data and tested on remaining 30% of the validation data to check accuracy of the model.

Further, the text classification module 224 may utilize one of the already trained model like Support Vector Machine, Naives Bayes, Random Forest on the development data to associate the data to the causal part mapped to the subsystem contained in the lexicon list.

Further, the text classification module 224 may test on the validation data set where the outcome of the technique will be the probabilities of comments falling in the sub-system. The output of the text classification module 224 may be presented as below in Table 4

TABLE 4

| Customer Complaint | Subsystem (TRUE) | Probability (Audio Navigation) | Probability (Electronics) | Probability (Chassis) | Subsystem (MAX Predicted) |
|---|---|---|---|---|---|
| CUSTOMER STATES THE TRANSMISSION JERKS AT LOW SPEEDS. RADIO GOES BLANK AND WILL NOT PLAY | Audio Navigation | 0.75 | 0.10 | 0.15 | "Audio Navigation" |
| CUSTOMER STATES THAT THE BATTERY IS LEAKING. | Electronics | 0.3 | 0.6 | 0.1 | "Electronics" |

The classification accuracy may be calculated from the above table, as follows: Column subsystem (MAX Predicted) contains the classified subsystem and subsystem (TRUE) contains the already tagged subsystem within the mapped data. Comparison is done with the subsystem (MAX Predicted) and subsystem (TRUE) then it is correct classification or else the classification is incorrect. Summing up the Correct and Incorrect classification helps in identifying the model accuracy.

Further, the text classification module 224 may calculate the score for each voice of customer data set for current month t which is a function of count of incidences in current month t, growth rate from current month t to previous month t−1, growth rate from current month t to six month earlier t−6, average growth rate from t−6 to t.

The score is a monotonic function in current month incidences $X_t$, so score is directly proportional to $X_t$. The score increases with the increase in growth rate ($G_t$); if the growth rate from the last month is high, the score is high. If the growth rate decreases, it means that the actions being taken by the manufacturer are bearing results. In case $G_t$ is negative, the score reduces that is score is exponentially proportional to $G_t$;

Score $\alpha$ $X_t^{Gt}$

Score $\alpha$ $G_t$ log $X_t$

The score is a monotonic function of the average number of incidences ($X_c$) in the past six months. As the number of incidences increase score may be higher Score $\alpha$ $X_c$ Again, the score will also increase with the average growth rate ($G_c$) in past six months. Average growth rate in past six months can be calculated as follows $G_c = (G_{t-6}, G_{t-5}, G_{t-4}, G_{t-3}, G_{t-2}, G_{t-1})/6$ If the overall growth rate is positive than it needs to be looked into, Score $\alpha$ $X_c^{Gc}$ Score $\alpha$ $G_c$ log $X_c$ The score will be affected by overall growth rate in past six months (G(t, t−6)). If it is positive it needs to be looked into. Thus, Score $\alpha$ G(t, t−6)

The final score is calculated as:

$$\text{Score} = (AX_t^G X_c G_c)^{G[t,t-6]} \text{ where } A \text{ is a constant.}$$

This is considered as 1.

$$\text{Score} = G_{(t,t-6)} \log(X_{t}^{G} X_{c}^{G})$$
$$= G_{(t,t-6)}\{G_t \log X_t + G_c \log X_c\}$$

If the vehicle is only under production for 1 month then the score is

Score=actual number of incidences

Score=$X_t$

If the vehicle is in production for less than 6 months but greater than 1 month then the average values of $G_c$ and $X_c$ is calculated based on number of observations available. Any monotonic transformation may be used for calculating the score and this function is ordinal in nature and not cardinal.

In similar way, the text classification module 224 may compute the estimated score for each part from different data sets and the score across all data sets is normalized to 1000 as follows:

(Score for each part for a particular dataset/Total score for that data set)*1000.

The sensor data module 226 is configured to classify each of the Diagnostic Trouble Codes (DTC) from the sensor dataset to the causal part associated with the subsystem. Raw Sensor data may include fields such as vehicle identification number (VIN), date of DTC occurred, DTC code and other such fields. The sensor data is associated with the warranty data in order to obtain the causal part failure associated with the vehicle using VIN as a key between the two datasets. Sensor data contains DTC data and warranty data has the part failure data for each VIN. By combining the two datasets together the table below can be prepared, wherein all the DTC codes which were triggered in a vehicle, the actual failure caused and the delay between the DTC occurrence and the part failure are obtained. Using machine learning techniques like Apriori, the pattern of DTC related to a causal parts are identified. The raw data is converted to transaction data as shown below in Table 5 for applying the sequence detection technique.

TABLE 5

| VIN | DTC | DTC Date | Time Lag (days) | Causal Part |
|---|---|---|---|---|
| 123141351 | D1 | 24th Mar. | 30 | Part A |
| 123124235 | D2 | 15th Jun. | 54 | Part B |
| 123141351 | D2 | 5th Apr. | 87 | Part B |
| 123141351 | D3 | 7th May | 49 | Part B |
| 123141351 | D1 | 8th Sep. | NA | No part failure |

TABLE 5-continued

| VIN | DTC | Causal Part |
|---|---|---|
| 123141351 | D1 | Part A |
| 123124235 | D2 | Part B |
| 123141351 | D2, D3 | Part B |
| 124356454 | D1, D5, D6 | No Failure |

In an embodiment, the sensor data module 226 may obtain association rules/patterns between the occurrence of the DTC code and the causal part as output based on pattern mining technique. Using the machine learning technique, DTC code occurrence leading to the actual part failure in the data, may be identified. In order to improve the accuracy of pattern identification, the technique also includes the data where DTC code occurred but there were no failures in the vehicle. Pattern mining technique helps to get the following information: DTC Pattern: Sequence of DTC occurred, Confidence: How confident that sequence of DTC generated. Support: proportion of such rules in the entire sensor data set. Output of this step is given Table 6 below:

TABLE 6

| DTC Pattern | Causal Part | Confidence | Support |
|---|---|---|---|
| D1, D2, D3 | Part A | 0.727 | 0.00317 |
| D2 | Part B | 0.465 | 0.01045 |

From the Table 6, it may be implied that where support for DTC Pattern "D1, D2, D3" has a support of 0.3% that in the entire population D1, D2 and D3 occurs 0.3% of the data in table 2. The confidence of 72.7% indicates that for 72.7% of the transactions where D1, D2, D3 occurs Part A fails. The final rules are selected based on cut-off threshold on confidence and support and with the help of domain review In an embodiment, the sensor data module 226 may compute the score for each DTC pattern as follows
Score for each DTC pattern=Number of vehicle identification number (VIN) that this pattern occurred*Confidence. A Causal Part can have more than one DTC Pattern Rules associated with it, in order to obtain the Score at the Causal Part following formula is used—Σ{Score at Pattern Level*(Support of the Pattern/Total Support for the Causal Part)}.

Similar to voice of customer (VOC) data, the final score of DTC data set is a function of current month t score of causal part, growth rate from current month t to previous month t−1, growth rate from current month t to six month earlier t−6, average growth rate from t−6 to t. Final score is calculated as:

$$Score = G_{(t,t-6)}\{\log A + G_t \log C_t + G_c \log C_c\}$$

Where
$C_t$=Current month of causal part score
$G_t$=Growth rate of causal part score
$C_c$=Average causal part score in the past six months $$G_c = (G_{t-6}, G_{t-5}, G_{t-4}, G_{t-3}, G_{t-2}, G_{t-1})/6$$

$G_{(t,t-6)}$=Overall growth rate of causal part score in past six months

In an embodiment, the prioritization module 228 is configured to obtain a combined emerging issue score for every causal part obtained from the unstructured data like voice of customer data-customer appointment data, repair order data, customer call center data, survey data and the like and structured data like sensor data. The prioritization module 228 may give a weightage to data set based on user importance of the VOC data sets or based on how early an issue gets reported in the data set which can be derived from the mean distribution from the vehicle sale data.

The number incidences reported in manufacturing industry tends to increase for some time before reducing. Based on this observation, extreme value distributions like beta, Weibull or a non-parametric distributions are more suited for representing the distribution of the time an incidence being reported.

For VOC data, the time gap between the causal parts appearance in the data set and the appearance in claims is calculated. For example, as illustrated in the table below, the time gap between the causal parts appearance in the data set and the appearance in claims for various vehicle subsystems are presented in Table 7.

TABLE 7

| Vehicle Identification number (VIN) | Causal Part | Customer Appointment Date | Warranty Claim Date | Time Gap |
|---|---|---|---|---|
| AAAXXX001 | Part A | 12 Apr. 2015 | 24 Aug. 2015 | 134 |
| AAAXXX002 | Part B | 3 Apr. 2015 | 6 May 2015 | 33 |
| AAAXXX003 | Part A | 29 Mar. 2015 | 3 Apr. 2015 | 5 |
| AAAXXX004 | Part D | 1 Jun. 2015 | 9 Aug. 2015 | 69 |

Further, the prioritization module 228 may fit the different distributions such as "Weibull', 'Beta', "Exponential", "Lognormal", "Gamma", "Logistic" and "Cauchy" over this time gap for each vehicle part. The mean of the fitted distribution for each causal part is calculated. Relative mean time may be used as weights to derive the relative number of incidences.

For DTC data, the time gap between the occurrence of the last DTC code of the DTC pattern in the data set and the appearance in claims is calculated. For example, as illustrated in the table below, the time gap between the appearance of the last DTC of the DTC pattern in the data set and the appearance in claims for various vehicle subsystems are presented in Table 8.

TABLE 8

| Vehicle Identification number (VIN) | Causal Part | DTC Pattern | DTC Date | Warranty Claim Date | Time Gap |
|---|---|---|---|---|---|
| AAAXXX001 | Part A | D1 | 24 May 2015 | 24 Aug. 2015 | 90 |
| AAAXXX002 | Part B | D2 | 7 Apr. 2015 | 6 May 2015 | 29 |
| AAAXXX003 | Part A | D2, D3 | 18 Mar. 2015 | 3 Apr. 2015 | 15 |

Further, the prioritization module 228 may fit the different distributions such as "Weibull', 'Beta', "Exponential", "Lognormal", "Gamma", "Logistic" and "Cauchy" over this time gap for each vehicle part. The mean of the fitted distribution for each causal part is calculated. Relative mean time may be used as weights to derive the relative number of incidences.

In an embodiment, the prioritization module 228 may be caused to identify the "causal part coverage" which is the percentage of causal parts being covered in each data set. For example, if in a car there are total of 1500 causal parts, but in a particular source of dataset say, customer appointment data, only 700 parts get a score then the causal part coverage of customer appointment data is 700/1500=0.4667.

In an embodiment, the prioritization module 228 may compute a combined emerging issue score for a particular month. An example of computation of the combined emerging issue score is given below. Normalized score of causal part in Repair Order Data in said month*Causal Part Coverage in Repair Order Data*Weight of Repair Order Data+ Normalized score of causal part in Appointment Data in that month*Causal Part Coverage in Appointment Data*Weight of Appointment Data+ Normalized score of causal part in Sensor Data in that month*Causal Part Coverage in Sensor Data*Weight of Sensor Data+ Normalized score of causal part in Call Center Data in that month*Causal Part Coverage in Call Center Data*Weight of Call Center.

Figure 3:
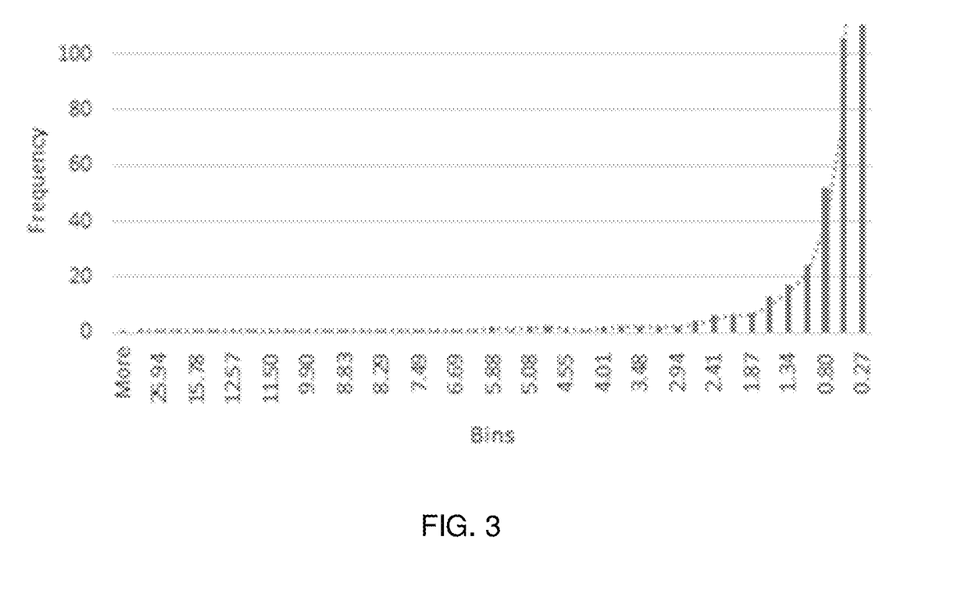
FIG. 3 illustrates a plot of an aggregated emerging issue score for a plurality of causal parts of a vehicle according to some embodiments of the present disclosure.

In an embodiment, the prioritization module 228 may be caused to refresh the emerging issue scores daily, weekly or monthly and rank the causal parts based on combined emerging issue score. Higher is the score, severe is the issue with the causal parts. In order to identify the cut-off or threshold score, the following technique is used:
The emerging issue score is plotted for all the causal parts—An example plot for the emerging issue score is shown in FIG. 3. Referring now to FIG. 3, FIG. 3 represents a plot for number of causal part falling in each bin. X-axis of the plot refers to the emerging issue score and Y-axis of the plot refers to the number of causal parts which have the causal part in that range. Based on an elbow point of the curve, a threshold is defined which in this case is said to 0.80. Herein, the 'Elbow point' is defined as the point at which the rate of change between two subsequent points is the highest. All the Causal Parts which have higher score than 0.802399 are marked as critical, which implies that there are high number of complaints in these parts based on the text data, which may come into warranty claims in later months. These parts should be looked into by the manufacturer and they should take steps to open a counter measure with the engineers, which implies, that the engineers should take it up and fix the problem in the future car models that the manufacturer will be producing.

Figure 4:
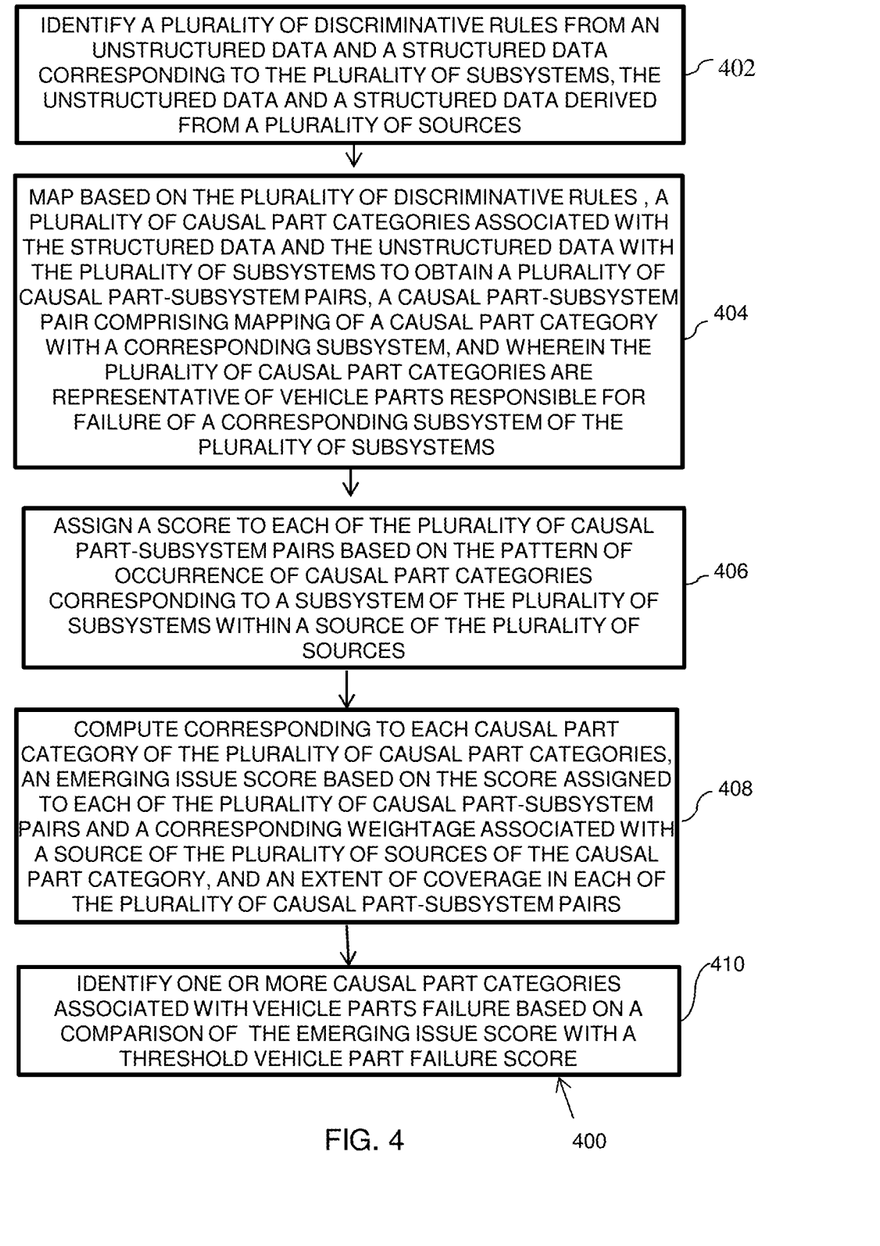
FIG. 4 illustrates early detection of vehicle parts failure using unstructured and structured data, according to some embodiments of the present disclosure.

FIG. 4 illustrates a flowchart of a method 400 for early detection of vehicle parts failure, in accordance with an example embodiment. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof.

In an embodiment, the method 400 depicted in the flow chart may be executed by a system, for example, the system 200 of FIG. 2. In an example embodiment, the system 200 may be an example of the system 102 (FIG. 1).

At 402, the method 400 includes identifying a plurality of discriminative rules from an unstructured data and a structured data corresponding to the plurality of subsystems, the unstructured data and a structured data derived from a plurality of sources.

At 404, the method 400 includes mapping based on the plurality of discriminative rules, a plurality of causal part categories associated with the structured data and the unstructured data with the plurality of subsystems to obtain a plurality of causal part-subsystem pairs, a causal part-subsystem pair comprising mapping of a causal part category with a corresponding subsystem, and wherein the plurality of causal part categories are representative of vehicle parts responsible for failure of a corresponding subsystem of the plurality of subsystems.

At 406, the method 400 includes assigning a score to each of the plurality of causal part-subsystem pairs based on the pattern of occurrence of causal part categories corresponding to a subsystem of the plurality of subsystems within a source of the plurality of sources.

At 408, the method 400 includes computing corresponding to each causal part category of the plurality of causal part categories, an emerging issue score based on the score assigned to each of the plurality of causal part-subsystem pairs and a corresponding weightage associated with a source of the plurality of sources of the causal part category, and an extent of coverage in each of the plurality of causal part-subsystem pairs.

At 410, the method 400 includes identifying one or more causal part categories associated with vehicle parts failure based on a comparison of the emerging issue score with a threshold vehicle part failure score.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A computer-implemented method for early detection of vehicle parts failure for a vehicle having a plurality of subsystems, the method comprising:
   identifying, via one or more hardware processors, a plurality of discriminative rules from an unstructured data and a structured data corresponding to the plurality of subsystems, the unstructured data and the structured data derived from a plurality of sources, wherein a set of sources of the plurality of sources are a plurality of sensors;
   mapping, via the one or more hardware processors, and based on the plurality of discriminative rules, a plurality of causal part categories associated with the structured data and the unstructured data with the plurality of subsystems to obtain a plurality of causal part-subsystem pairs, a causal part-subsystem pair comprising mapping of a causal part category with a corresponding subsystem using a training dataset, and wherein the plurality of causal part categories are representative of vehicle parts responsible for failure of corresponding subsystems;
   assigning, via the one or more hardware processors, a score to each of the plurality of causal part-subsystem pairs based on the pattern of occurrence of causal part categories corresponding to a subsystem of the plurality of subsystems within a source of the plurality of sources;
   computing, via the one or more hardware processors, and corresponding to each causal part category of the plurality of causal part categories, an emerging issue score based on the score assigned to each of the plurality of causal part-subsystem pairs and a corresponding weightage associated with a source of the plurality of sources of the causal part category, and an extent of coverage of the each causal part in each of the plurality of causal part-subsystem pairs; and identifying, via the one or more hardware processors, one or more causal part categories associated with vehicle parts failure based on a comparison of the emerging issue score with a threshold vehicle part failure score.

2. The method of claim 1, wherein the structured data comprises telematics data.

3. The method of claim 1, wherein the unstructured data comprises one or more of complaint logs, appointment logs, surveys, opinion expressed by customers on web, and warranty data.

4. The method of claim 1, further comprising updating the plurality of rules based on one or more machine learning models.

5. The method of claim 1, wherein, identifying the one or more causal part categories associated with vehicle parts failure comprises determining the emerging issue score associated with the one or more causal part categories to be greater than or equal to the threshold vehicle part failure score.

6. A system for early detection for vehicle parts failure of a vehicle having a plurality of subsystems, the system comprising:
one or more memories storing instructions; and
one or more hardware processors coupled to said one or more memories, wherein said one or more hardware processors are configured by said instructions to:
identify a plurality of discriminative rules from an unstructured data and a structured data corresponding to the plurality of subsystems, the unstructured data and the structured data derived from a plurality of sources, wherein a set of sources of the plurality of sources are a plurality of sensors;
map based on the plurality of discriminative rules, a plurality of causal part categories associated with the structured data and the unstructured data with the plurality of subsystems to obtain a plurality of causal part-subsystem pairs, a causal part-subsystem pair comprising mapping of a causal part category with a corresponding subsystem using a training dataset, and wherein the plurality of causal part categories are representative of vehicle parts responsible for failure of corresponding subsystems;
assign a score to each of the plurality of causal part-subsystem pairs based on the pattern of occurrence of causal part categories corresponding to a subsystem of the plurality of subsystems within a source of the plurality of sources;
compute, corresponding to each causal part category of the plurality of causal part categories, an emerging issue score based on the score assigned to each of the plurality of causal part-subsystem pairs and a corresponding weightage associated with a source of the plurality of sources of the causal part category, and an extent of coverage of the each causal part in each of the plurality of causal part-subsystem pairs; and
identify one or more causal part categories associated with vehicle parts failure based on a comparison of the emerging issue score with a threshold vehicle part failure score.

7. The system of claim 6, wherein the structured data comprising telematics data.

8. The system of claim 6, wherein the unstructured data comprises one or more of complaint logs, appointment logs, surveys, opinion expressed by customers on web, and warranty data.

9. The system of claim 6, wherein the one or more hardware processors are further configured by said instructions to update the plurality of rules based on one or more machine learning models.

10. The system of claim 6, wherein to identify the one or more causal part categories associated with vehicle parts failure, the one or more hardware processors are configured by said instructions to determine the emerging issue score associated with the one or more causal part categories to be greater than or equal to the threshold vehicle part failure score.

11. A non-transitory computer-readable medium having embodied thereon a computer program for executing, a computer-implemented method for early detection of vehicle parts failure for a vehicle having a plurality of subsystems comprising:
identifying, via one or more hardware processors, a plurality of discriminative rules from an unstructured data and a structured data corresponding to the plurality of subsystems, the unstructured data and the structured data derived from a plurality of sources, wherein a set of sources of the plurality of sources are a plurality of sensors;
mapping, via the one or more hardware processors, and based on the plurality of discriminative rules, a plurality of causal part categories associated with the structured data and the unstructured data with the plurality of subsystems to obtain a plurality of causal part-subsystem pairs, a causal part-subsystem pair comprising mapping of a causal part category with a corresponding subsystem using a training dataset, and wherein the plurality of causal part categories are representative of vehicle parts responsible for failure of corresponding subsystems;
assigning, via the one or more hardware processors, a score to each of the plurality of causal part-subsystem pairs based on the pattern of occurrence of causal part categories corresponding to a subsystem of the plurality of subsystems within a source of the plurality of sources;
computing, via the one or more hardware processors, and corresponding to each causal part category of the plurality of causal part categories, an emerging issue score based on the score assigned to each of the plurality of causal part-subsystem pairs and a corresponding weightage associated with a source of the plurality of sources of the causal part category, and an extent of coverage of the each causal part in each of the plurality of causal part-subsystem pairs; and
identifying, via the one or more hardware processors, one or more causal part categories associated with vehicle parts failure based on a comparison of the emerging issue score with a threshold vehicle part failure score.

* * * * *